United States Patent [19]

Thierion

[11] 4,397,130

[45] Aug. 9, 1983

[54] MACHINE FOR LOADING AND UNLOADING CONTAINERS OF ARTICLES ARRANGED IN ROWS

[76] Inventor: Michel Thierion, Muizon, 51140 Jonchery-sur-Vesle, France

[21] Appl. No.: 261,563

[22] Filed: May 7, 1981

[30] Foreign Application Priority Data

May 12, 1980 [FR] France ................ 80 10600

[51] Int. Cl.³ .................... B65B 5/06; B65B 5/10
[52] U.S. Cl. ........................... 53/77; 53/247
[58] Field of Search ............. 53/77, 150, 247, 539, 53/148, 531, 544, 249, 251, 255

[56] References Cited

U.S. PATENT DOCUMENTS

| | | | |
|---|---|---|---|
| 2,999,343 | 9/1961 | Berry | 53/539 |
| 3,327,450 | 6/1967 | Carter | 53/247 X |
| 3,859,772 | 1/1975 | Thierion | 53/247 X |
| 3,878,665 | 4/1975 | Couten | 53/247 X |
| 4,294,059 | 10/1981 | Stilwell et al. | 53/247 X |

*Primary Examiner*—Horace M. Culver
*Attorney, Agent, or Firm*—Murray & Whisenhunt

[57] ABSTRACT

A machine loads and unloads containers with articles arranged in rows by transferring articles between a first station outside the containers and a second station inside a container. It comprises a vertical support adjacent the first and second stations and an arm on this support which pivots through 90° C. between a first position over the first station and a second position over the second station. Chains around four pulleys on the arm are paid out and wound in synchronously by the rotation of the pulleys. The chains extend to one end of the arm and then downwardly through respective apertures in the arm. The chains are attached to a platform moveable vertically which carries suckers for manipulating the articles, through chain tension detector and centering means on the platform which operate with the platform in its highest position. Further chain tension detector means on the path of the chains monitor the tension in the chains.

8 Claims, 4 Drawing Figures

MACHINE FOR LOADING AND UNLOADING CONTAINERS OF ARTICLES ARRANGED IN ROWS

BACKGROUND OF THE INVENTION

1. Field of the Invention

The invention relates to a machine for automatically loading or unloading containers for the transportation of individual articles arranged in rows. To provide a concrete example, the remainder of this specification will refer to articles in the form of full bottles arranged in rows in containers in superposed layers. Each layer comprises two rows of bottles with their tops directed in opposite directions, with the bottles in each row arranged in head-to-tail configuration.

In this case the machine is fitted with handling means able to manipulate bottles on their side. Provided that these handling means are suitably modified, the machine in accordance with the invention may be used for handling articles other than bottles.

2. Description of the Prior Art

Automatic machines for carrying out the function defined hereinabove already exist. An example is described in French patent specification No. 73-06236. This machine operates satisfactorily at a high rate of throughput of approximately 10,000 to 12,000 bottles per hour. In order to operate satisfactorily at this high rate of throughput, however, the machine is fabricated from a relatively large number of components which move along rigid slideways to ensure accuracy of movement. For this reason the machine is expensive and also expensive to maintain.

The primary objective of the present invention is to simplify the design of the machine as described in the aforementioned patent specification, in particular to reduce its price, while maintaining satisfactory automatic operation, reducing maintenance costs and maintaining a high rate of throughput of approximately 6,000 bottles per hour.

This is not such a simple matter as might at first appear, since the component parts of the machine must continue to move accurately but the elimination of accurately guided rigid units tends to rapidly reduce the accuracy of such movement.

SUMMARY OF THE INVENTION

The present invention consists in a machine for loading and unloading containers of articles arranged in rows by transferring said articles between a first station outside said containers and a second station inside a container, said machine comprising: a vertical support adjacent said first and second stations; an arm mounted on said supprt and pivotable through 90° between a first position in which one end of said arm lies over said first station and a second position in which said one end of said arm lies over said second station; four first pulleys on said arm; respective chains around said first pulleys, paid out and wound in synchronously by the rotation of said first pulleys, said chains extending to said one end of said arm and then downwardly; respective apertures in said arm through which said downwardly extending chains pass; a platform moveable vertically; suckers for manipulating said articles, mounted on said platform; respective first chain tension detector means and at least two centering means on said platform, operative with said platform in its highest position; respective components on said platform to which said chains are attached via said first chain tension detector and centering means; and second chain tension detector means disposed on the path of said chains to monitor the tension in said chains.

Other objects and advantages will appear from the following description of an example of the invention, when considered in connection with the accompanying drawings, and the novel features will be particularly pointed out in the appended claims.

IN THE DRAWINGS

DESCRIPTION OF THE PREFERRED EMBODIMENT

As has previously been stated, the machine in accordance with the invention is a considerably simplified version of the machine described in French patent specification No. 73-06236. It therefore shares certain components with the aforementioned machine, and these components will not be described in detail herein. The remainder of this description will be limited to those new components falling within the scope of the present invention.

Figure 1:
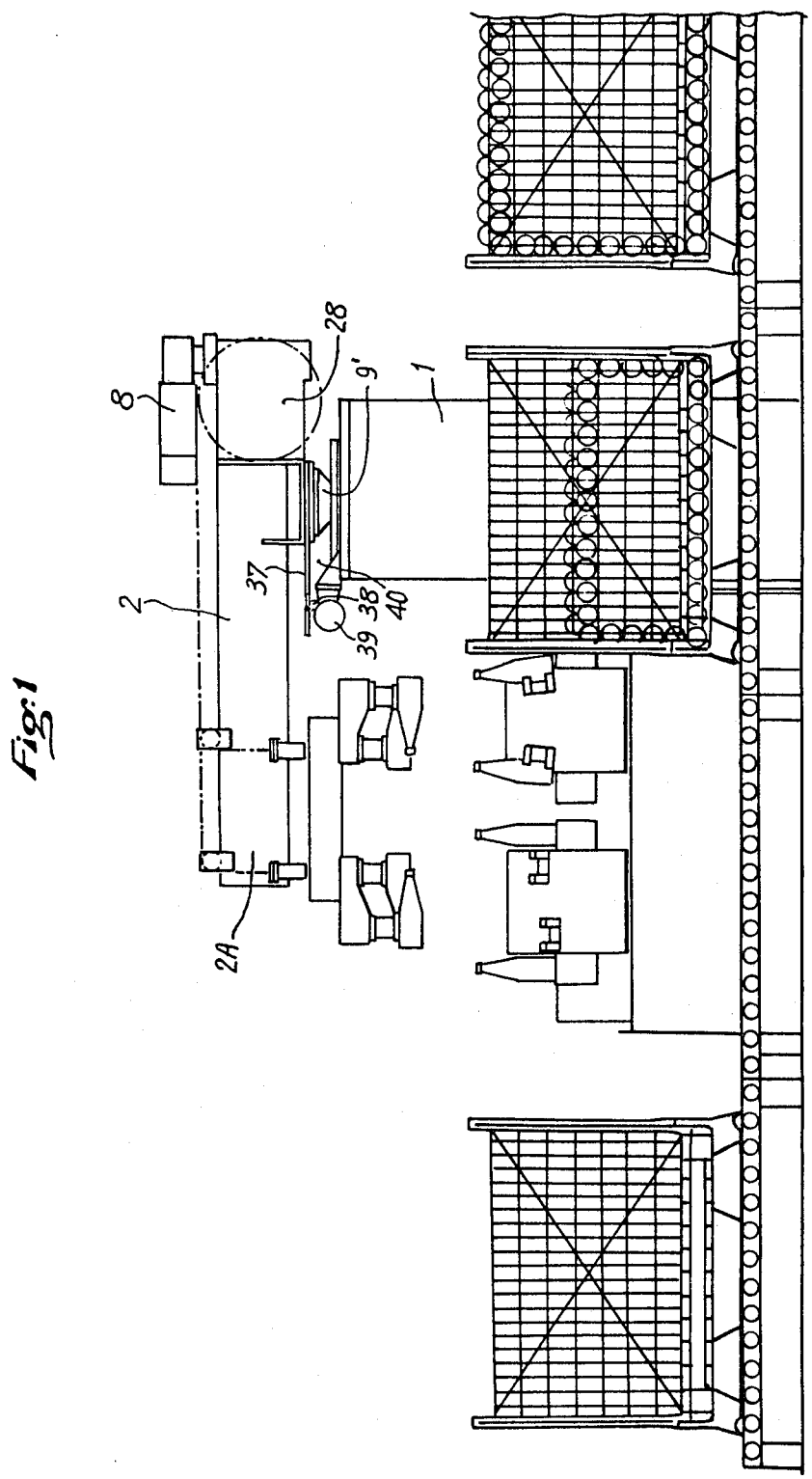
FIG. 1 is a general view in elevation of a machine in accordance with the invention disposed adjacent a bottle feed station A and an empty container feed station B, the machine being shown in one of its operating positions.
Figure 2:
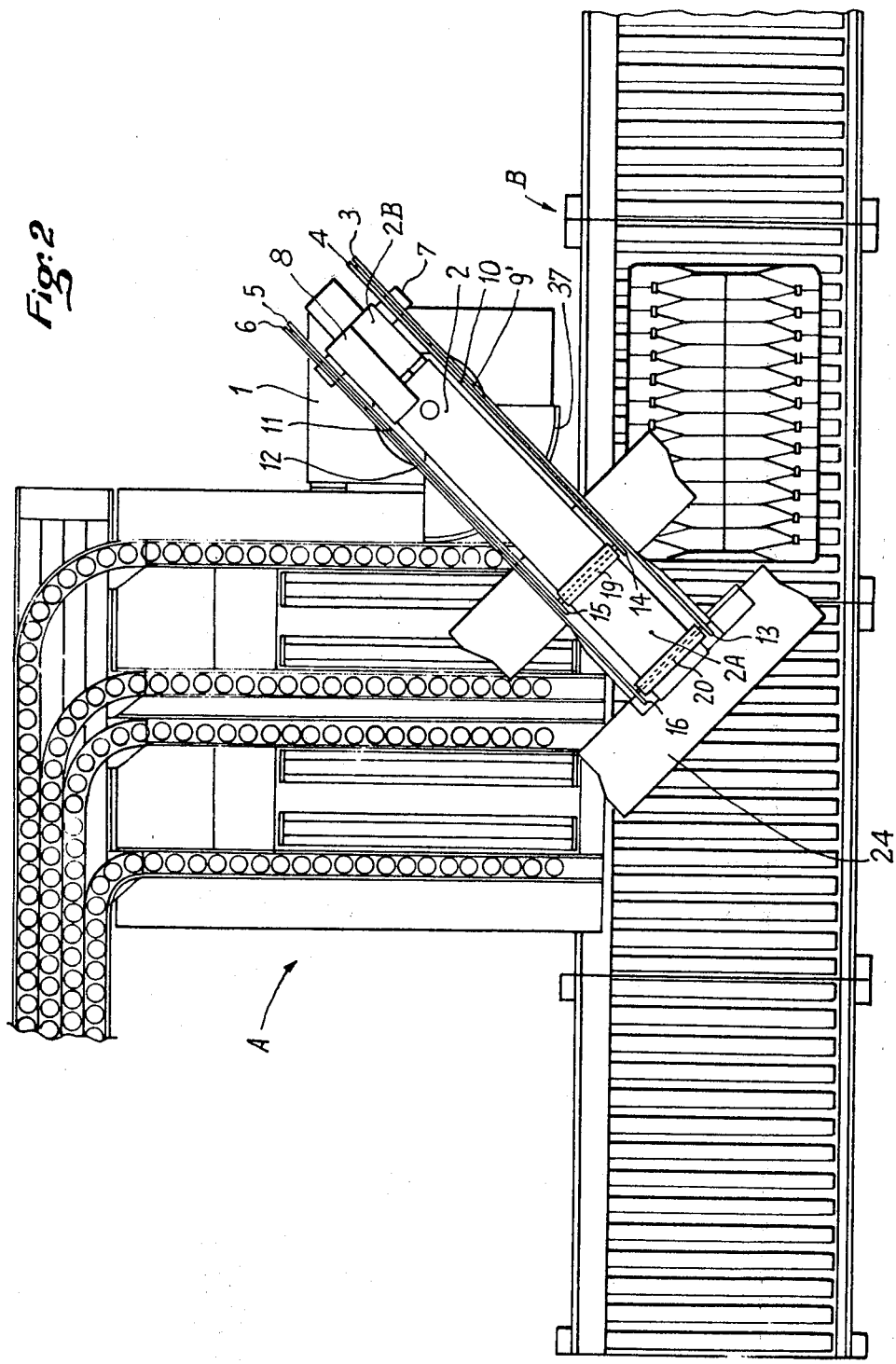
FIG. 2 is a general plan view of the machine shown in FIG. 1, in another operating position.
Figure 3:
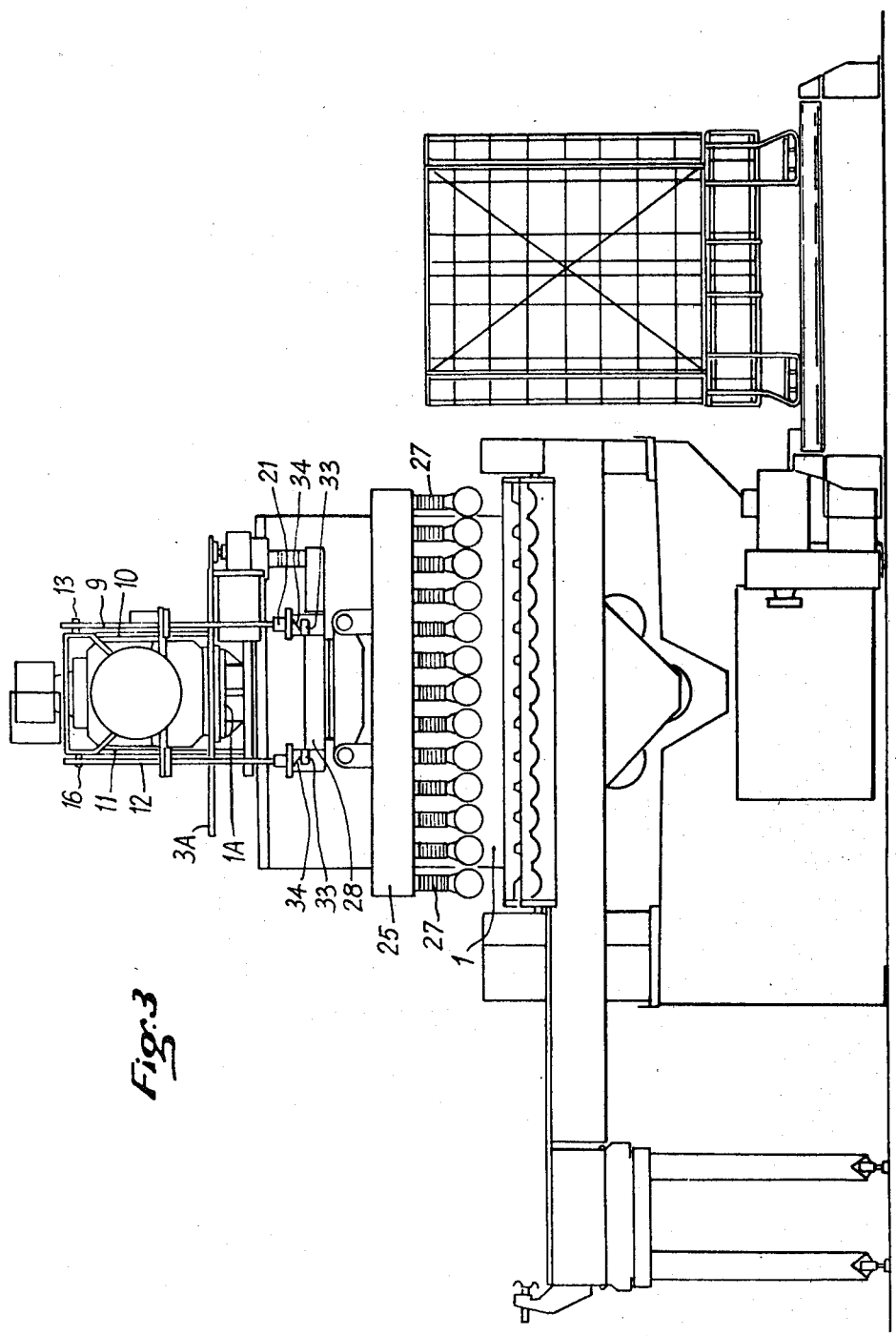
FIG. 3 is a general side view of the machine, shown in the same operating position as in FIG. 1.

A first station A feeding bottles on their side and a second station B feeding empty containers are arranged at right angles to one another. Station A terminates at one end perpendicularly to a rectilinear container transporter. At this end of station A is a device which places the bottles on their side to form two spaced rows each composed of two lines of bottles arranged in head-to-tail configuration as shown in FIG. 1. In this example each row comprises 25 bottles and when the two rows are brought together and placed in a container they cover the entire area of the container. A complete layer of the container is filled each time two rows of bottles on their side are placed in the container.

The device for laying the bottles on their side is described in the aforementioned French patent specification, and does not constitute part of the machine in accordance with the invention, which would be capable of operating with any suitable alternative means for constituting two rows of bottles on their side, arranged in head-to-tail configuration in each row.

The machine described herein by way of example comprises a vertical support 1 on which is mounted a horizontal arm 2 pivoting through an angle 90° so that a first free end portion 2A of the arm can occupy a first position in which it lies over station A or a second position in which it lies over station B. The arm 2 is equipped with four pulleys 3, 4, 5, 6 which are synchronously driven in rotation. To this end, the four pulleys 3 to 6 are keyed to a common shaft 7 which is coupled to an electric motor-gearbox unit 8. For reasons of balance, it is preferable to mount the pulleys 3 to 6 and the motor-gearbox unit 8 at the second free end 2B of the arm 2 opposite the first free end 2A thereof, on the opposite side of the pivot 9' on the support 1. The shaft 7 is arranged transversely relative to the arm 2. The two pulleys 3 and 4 are keyed to one end of this shaft, outside the lateral surface of the arm 2. The other two pulleys 5 and 6 are keyed to the other end of the shaft 7, outside the opposite lateral surface of the arm 2.

To each of pulleys 3 to 6 there is attached one end of a respective chain 9, 10, 11 or 12, these chains extending parallel to the arm 2 to the first free end portion 2A. Each of chains 9 to 12 passes around a corresponding pulley 13 to 16 and then passes vertically downwards through a respective aperture. Only two of these four apertures are visible in the figures (apertures 17 and 18 shown in FIG. 4).

Pulleys 13 to 16 are keyed in pairs to the opposite ends of two transverse shafts 19 and 20 supported in appropriate bearings mounted on the top surface of the arm 2. The transverse shafts 19 and 20 are separated in the longitudinal direction of the arm 2 by a distance which corresponds to the separation between two rows of bottles on their side in the device for laying the bottles on their side at station A.

The four openings through which chains 9 to 12 pass are formed in sideplates attached to the sides of the arm 2. At its free end each of chains 9 to 12 carries a respective rod 21. These rods 21 pass through the respective apertures (17, 18) and each is fitted with damping means 22 and detector means 23. These will be described in detail later.

Each of chains 9 to 12 is coupled through the respective rod 21 at its end to a platform 24 comprising two panels 25 and 26 which can be moved closer together or further apart in a symmetrical manner. Each panel 25 and 26 is fitted with two series of suckers 27 designed to grip bottles on their side in head-to-tail configuration, as placed in this position at station A. Platform 24 will not be described in greater detail herein, as it is described in French patent specification No. 73-06236. Likewise, the suckers 27 are described in French patent specification No. 76-34150, and will not be described in detail herein.

Panels 25 and 26 move relative to one another by means of guide slides and an actuator (not shown). These slides are attached to a top component 28 of the platform 21, to which the rods 21 on the ends of chains 9 to 12 are also attached, in the manner now to be described. Beneath each aperture (17, 18) each rod 21 carries a ring 29 which slides on it with limited clearance. The ring 29 is not able to pass through the aperture (17, 18), being stopped by the edges of the aperture during its upward movement. Each rod 21 extends below the ring 29 and into a vertical housing 30 which constitutes part of component 28. Each housing 30 is closed at its upper end beneath ring 29 and open at its lower end. Within the housing 30 the rod 21 is surrounded by a compression spring 31 which is retained longitudinally between the base of the housing 30 and a washer, itself retained by an enlarged portion 32 at the lower end of the rod 21. The four housings 30 constitute an integral part of the component 28 and in combination with the rods 21, rings 29 and springs 31 constitute the aforementioned damping means 22. The aforementioned detector means 23 are constituted by, on the side of each housing 30, a microswitch 33 with an actuator 34 maintained in the closed position by the bottom surface of the ring 29.

During downward motion of chains 9 to 12 and consequently of component 28 and platform 24 the rings 29 move with the rods 21 and the microswitches 33 remain closed. The same applies during the upward movement of chains 9 to 12, except that when the rings 29 arrive at the apertures (17, 18) they are stopped while the rods 21 continue to move upwards, sliding through the rings 29 and compressing the springs 31. This provides the necessary damping action at the end of the upward travel of chains 9 to 12. The microswitches 33 remain closed throughout the movements described so far.

Now suppose that the rings 29 are still spaced from the apertures (17, 18) and are moving upwards with the chains 9 to 12 and rods 21. Should the platform 24 encounter an obstacle during this upward movement, for example if one of its sides snags on the side of a container during it upward movement after placing bottles in the container, one or more of the rods 21 continues its movement relative to the housing 30, compressing spring 31 and entraining the ring 29 due to the limited clearance between the latter and the rod 21. Following a small displacement of the rod 21 the actuator 34 is released from contact with the ring 29 and a circuit is opened to stop the upward movement.

It will be understood that the invention is not limited to the type of damping means 22 or detector means 23 described hereinabove. Any appropriate alternative means may be used as substitutes therefore within the scope of the invention.

In addition to the damping means 22 and detector means 23, at least two of the rods 21 are fitted with centering means 35. Each centering means comprises a shaped member tapering upwardly and mounted on the rod 21 above the ring 29. At the end of upward movement of chains 9 to 12 these shaped members 35 enter into the apertures (17, 18) and progressively center the rods 21 by virtue of their engagement with these apertures. The shaped members 35 are also mounted on the rods 21 with limited clearance so as to avoid impeding relative movement of the rods inside the rings 29.

The springs 31 exert sufficient force to return the rods 21 to their initial position relative to the rings 29 and the shaped members 35 when the chains 9 to 12 are no longer tensioned by the weight of the platform 24 and the bottles transported.

Figure 4:
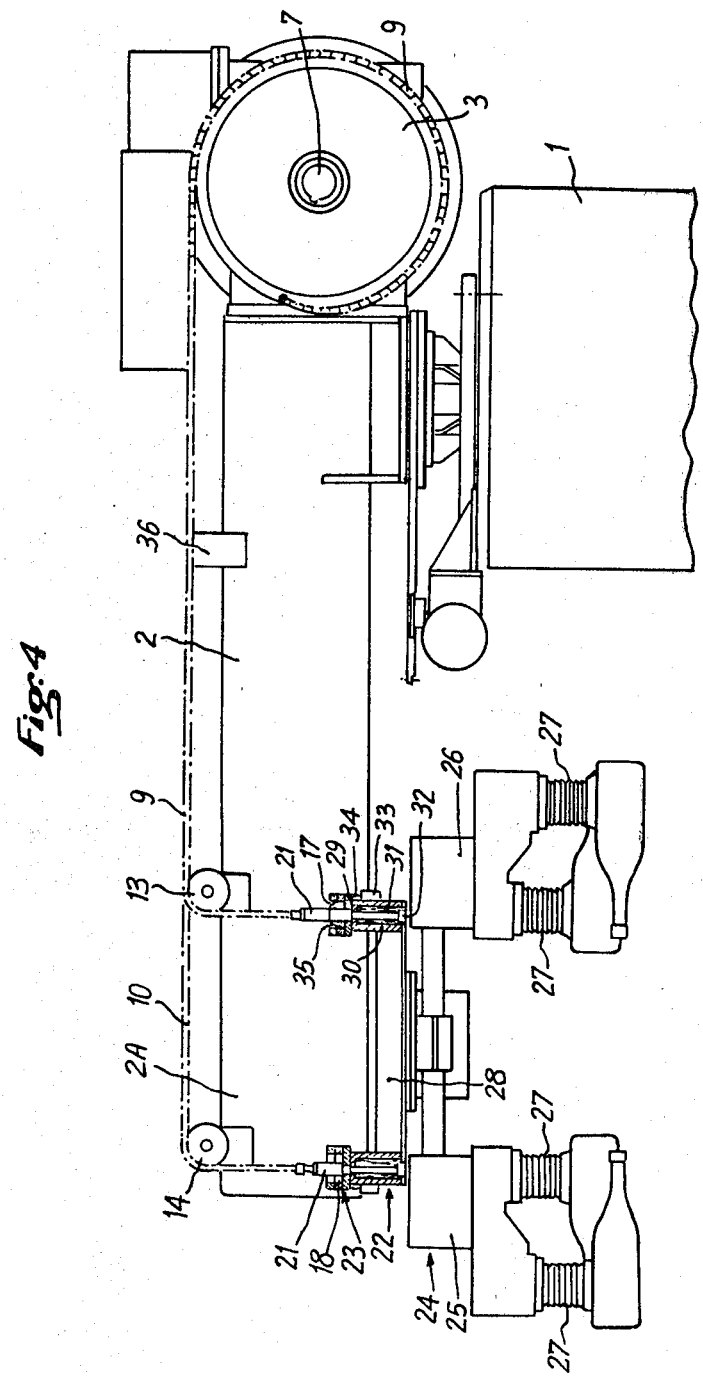
FIG. 4 is a partial view of the machine to a larger scale, this figure not showing the bottle or empty container feed stations.

The four pulleys 3 to 6 are of a diameter such that chains 9 to 12 are wound on through less than one turn as the platform 24 rises to its highest position, as shown in FIG. 4. In this condition, the platform 24 is in a well-defined position by virtue of the centering means 35 and is firmly held in this position due to the tension in the chains 9 to 12. Detector means 36 are mounted on the arm 2, on the path of chains 9 to 12, between the pulleys 3 to 6 and the pulleys 13 to 16. These detector means may be of any suitable type, such as photo-electric cells, for example. Their function is to detect any decrease in the tension in chains 9 to 12 exceeding a predetermined value and to respond by stopping the machine.

Above pivot 9' on which it is supported the arm 2 is fitted with a toothed sector 37 subtending an angle of 90° and engaging a toothed wheel 38 rotated by a motor 39. The latter is supported at the appropriate height by means of a bracket 40 attached to the support 1.

OPERATION

The operation of the machine as just described will now be described.

The platform 24 is moved to and held in its highest position by the tension in chains 9 to 12, monitored by detectors 36. In this condition the platform 24 is in a well-defined position relative to the arm 2, as determined by the co-operation of centering means 35, the apertures (17, 18) and rings 29. The arm 2 is then pivoted to the position shown in FIG. 1, in which the platform 24 lies over the station A in which the bottles are laid on their side. The pulleys 3 to 6 then pay out chains 9 to 12 so that the platform 24 descends until the suckers 27 grip the bottles on their side. The detectors 36 monitor the end of this movement and any accidential snagging during it.

When the bottles have been grasped, in the manner explained in the aforementioned French patent specifications, pulleys 3 to 6 wind in chains 9 to 12, raising platform 24 to its highest position (FIG. 1), in which it is firmly held in position as previously explained. In this condition motor 39 rotates arm 2 through 90° so that its end lies over the container at station D. During this movement the panels 25 and 26 of platform 24 are brought towards one another so that the platform is of reduced dimensions permitting it to move downwardly into the container to place in it the bottles constituting a complete layer. After immobilization of the arm 2, pulleys 3 to 6 pay out chains 9 to 12 again and lower platform 24, under the control of detectors 36, which stop the machine as soon as a predetermined drop in the tension in chains 9 to 12 is detected, either due to the platform 24 snagging the side of the container or as a result of the bottles arriving at their final position.

At this time the suckers 27 release the bottles and pulleys 3 to 6 wind in chains 9 to 12 to raise platform 24. The detector means 23 monitor this movement which is stopped if the platform 24 snags the container side or at the end of the upward movement, as previously explained. When the platform 24 is firmly immobilized in its highest position, as monitored by detectors 36, the arm 2 pivots through 90° to revert to its initial position. During this movement the panels 25 and 26 are moved away from one another and the cycle recommences.

It will be seen that the construction of the machine in acordance with the invention is considerably simplified as compared with that of the machine as described in the aforementioned French patent specification No. 73-06236. Nevertheless, it offers automatic operation in full security, a result obtained, as already demonstrated, by the judicious combination of mechanical components of simple design and appropriately disposed detector means.

In order to simplify the drawings the various electrical cables, compressed air lines and vacuum lines with which the machine is equipped have been omitted from the figures.

I claim:

1. A machine for loading and unloading containers of articles arranged in rows by transferring said articles between a first station outside said containers and a second station inside a container, said machine comprising a vertical support adjacent said first and second stations; an arm mounted on said support and pivotable through 90° between a first position in which one end of said arm lies over said first station and a second position in which said one end of said arm lies over said second station; four first pulleys on said arm; respective chains around said first pulleys, paid out and wound in sychronously by the rotation of said first pulleys, said chains extending to said one end of said arm and then downwardly; respective apertures in said arm through which said downwardly extending chains pass; a platform moveable vertically; suckers for manipulating said articles mounted on said platform; respective first chain tension detector means and at least two centering means on said platform, operative with said platform in its highest position; respective components on said platform to which said chains are attached via said first chain tension detector and centering means; and second chain tension detector means disposed on the path of said chains to monitor the tension in said chains.

2. A machine according to claim 1, wherein said four first pulleys are mounted on a common first transverse shaft connected to a motor-gearbox unit, said chains extending parallel to one another above the top surface of said arm to four second pulleys mounted in pairs on two spaced second transverse shafts and disposed above respective apertures in said arm.

3. A machine according to claim 2, wherein said motor-gearbox unit, said first transverse shaft and said four first pulleys are disposed at the end of said arm opposite and on the other side of the point about which said arm pivots to said one end thereof, and wherein said first chain tension detector means are disposed on said arm between said first pulleys and said second pulleys.

4. A machine according to claim 1, when each of said centering means comprises a rod attached to the end of the respective chain and passing through the respective aperture in said arm, with an upwardly tapering shaped member progressively engaging said aperture mounted on said rod.

5. A machine according to claim 1, wherein said chains are connected to said platform through damping means operative when said platform reaches its highest position or in response to said platform being stopped in its upward movement by an obstacle.

6. A machine according to claim 5, wherein each of said damping means comprises a vertical housing closed at its upper end and open at its lower end, constituting part of said component on said platform, a rod attached to the bottom end of the respective chain and passing through said housing, a compression spring within said housing, retained by a widened portion at the end of said rod, said spring being compressed on upward movement of said rod in response to said platform being stopped in its upward movement.

7. A machine according to claim 6, where each of said first spring tension detector means comprises a ring sliding with limited clearance on said rod beneath the respective aperture in said arm and unable to pass through said aperture, a microswitch mounted on a wall of said housing with its actuator maintained in one of two positions by said ring, movement of said ring simultaneously with said rod on compression of said spring releasing said actuator.

8. A machine according to claim 7, wherein each of said centering means comprises an upwardly tapering shaped member progressively engaging said aperture, mounted to slide with limited clearance on a respective rod, above the respective ring.

* * * * *